(12) United States Patent
Iwasa

(10) Patent No.: US 6,853,419 B2
(45) Date of Patent: Feb. 8, 2005

(54) REFLECTIVE LIQUID CRYSTAL DISPLAY HAVING FINE PIXELS

(75) Inventor: Takayuki Iwasa, Yamato (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 10/409,586

(22) Filed: Apr. 9, 2003

(65) Prior Publication Data
US 2003/0193632 A1 Oct. 16, 2003

(30) Foreign Application Priority Data

Apr. 12, 2002 (JP) ..................................... P2002-110478

(51) Int. Cl.[7] ........................ G02F 1/1335; G02F 1/136; H01L 29/04; G09G 3/36
(52) U.S. Cl. .......................... 349/113; 349/42; 349/43; 257/59; 257/72; 345/100
(58) Field of Search .......................... 349/42, 43, 113; 257/59, 72; 345/87, 100

(56) References Cited

U.S. PATENT DOCUMENTS

| 5,461,501 | A | | 10/1995 | Sato et al. ..................... 349/42 |
| 6,274,516 | B1 | * | 8/2001 | Kamei et al. ................ 438/782 |
| 6,636,194 | B2 | * | 10/2003 | Ishii .............................. 345/98 |
| 2002/0126233 | A1 | * | 9/2002 | Yamagishi et al. ........... 349/43 |
| 2003/0127672 | A1 | * | 7/2003 | Rahn et al. .................. 257/291 |

FOREIGN PATENT DOCUMENTS

JP     2001-249357     9/2001

* cited by examiner

Primary Examiner—Tarifur R. Chowdhury
(74) Attorney, Agent, or Firm—Marvin C. Berkowitz; Teresa M. Arroyo; Nath & Associates PLLC

(57) ABSTRACT

A reflective liquid crystal display has a matrix of pixels formed on a semiconductor substrate. The pixels include pixels A aligned in pixel-A columns and pixels B aligned in pixel-B columns. The pixel-A and pixel-B columns are alternated in a horizontal direction. A first fixed potential line (well line) is formed along each of the pixel-A columns and is connected to well regions of the pixels in the pixel-A column, to supply a first fixed potential (well potential) to the pixels in the pixel-A column and to the pixels in an adjacent one of the pixel-B columns through the well regions of the pixel-A column. A second fixed potential line (common line) is formed along each of the pixel-B columns and is connected to diffusion capacitor electrodes formed on hold capacitors of the pixels in the pixel-B column, to supply a second fixed potential (common potential) to the pixels in the pixel-B column and to the pixels in an adjacent one of the pixel-A columns through the diffusion capacitor electrodes of the pixel-B column.

2 Claims, 10 Drawing Sheets

REFLECTIVE LIQUID CRYSTAL DISPLAY HAVING FINE PIXELS

BACKGROUND OF THE INVENTION

1. Field of the Invention

The present invention relates to a reflective LCD (liquid crystal display), and particularly, to a reflective LCD having fine pixels formed on a semiconductor substrate with the pixels including first pixels (pixels A) arranged in first-pixel columns and second pixels (pixels B) arranged in second-pixel columns, the first- and second-pixel columns complementarily supplying a first fixed potential (well potential) and a second fixed potential (common potential) to each pixel in the first- and second-pixel columns.

2. Description of the Related Art

Projection-type large LCDs are widely used for outdoor public displays, control-board displays, high-vision-broadcast displays, SVGA computer displays, and the like.

The projection-type LCDs are largely classified into transmission LCDs and reflective LCDs. The transmission LCDs have a drawback. That is, a TFT (thin film transistor) provided for each pixel blocks light so that a transmission area transmitting light with respect to each pixel becomes smaller by area of the TFT. In other words, the numerical aperture of each pixel becomes smaller. For this reason, the reflective LCDs are attracting attention.

The reflective LCD mainly consists of a semiconductor substrate (Si substrate) on which MOSFETs (metal oxide semiconductor field effect transistors) serving as switching elements are connected to reflective pixel electrodes and hold capacitors, to form a matrix of pixels. Facing the reflective pixel electrodes, a transparent common electrode (counter electrode) serving for all pixels is formed on a transparent substrate (glass substrate). Between the semiconductor substrate and the transparent substrate, liquid crystals are sealed. Read light is made incident to the transparent substrate, and each potential difference between the common electrode and each reflective pixel electrodes is produced according to each video signal, to change alignments of the liquid crystals and thereby modulate the read light.

FIG. 1 is a sectional view showing a model of a pixel in a reflective LCD 10A according to a prior art, taken along orthogonal lines X and Y shown in FIG. 3.

FIG. 2A is a sectional view taken along a plane parallel to the surface of FIG. 1, showing a $p^-$ well region side, and FIG. 2B is a sectional view taken along a plane parallel to FIG. 1, showing a hold capacitor.

FIG. 3 is an enlarged plan view showing a model of a pixel in the reflective LCD 10A.

The reflective LCD 10A according to the prior art has many pixels to display images, and FIG. 1 shows one of the pixels. In FIG. 1, a semiconductor substrate 11 serves as a base and is a p-type (or n-type) substrate made of, for example, monocrystalline silicon (Si). The semiconductor substrate (hereinafter referred to as the p-type Si substrate) 11 has a $p^-$ well region 12, which is isolated in each pixel by left and right field oxide films 13A and 13B, as shown on the left side of the drawing. The $p^-$ well region 12 is provided with a switching element 14, which is a MOSFET.

The switching element (hereinafter referred to as the MOSFET) 14 has a gate oxide film 15 formed substantially at the center of the $p^-$ well region 12 and a polysilicon gate electrode formed on the gate oxide film 15, to provide a gate G.

On the left side of the gate G of the MOSFET 14, there is an LDD (lightly-doped drain) region 17A, which is a low-concentration $n^-$ impurity layer, and on the left side of the LDD region 17A, there is a source region 18, which is a high-concentration $n^+$ impurity layer. On the source region 18, a source contact (source electrode) 19, which is aluminum wiring, is formed to provide a source S.

On the right side of the gate G of the MOSFET 14, there is an LDD region 17B, which is a low-concentration $n^-$ layer, and on the right side of the LDD region 17B, there is a drain region 20, which is a high-concentration $n^+$ impurity layer. On the drain region 20, a drain contact (drain electrode) 21, which is aluminum wiring, is formed to provide a drain D.

The LDD regions 17A and 17B on both sides of the gate G of the MOSFET 14 function to relax voltage around the gate G.

On the right side of the $p^-$ well region 12 on the p-type Si substrate 11, a diffusion capacitor electrode 22 is formed by ion implantation. The electrode 22 is isolated in each pixel at the position shown in FIG. 1 by left and right field oxide films 13B and 13C. On the electrode 22, an insulating film 23 and a capacitor electrode 24 are formed in this order, to provide a hold capacitor C.

On the field oxide films 13A to 13C, gate electrode 16, and capacitor electrode 24, there are laminated a first interlayer insulating film 25, a first metal film 26, a second interlayer insulating film 27, a second metal film 28, a third interlayer insulating film 29, and a third metal film 30 in this order. The first, second, and third metal films 26, 28, and 30 are aluminum wiring formed in predetermined patterns.

The second metal film 28 blocks the read light L coming from a transparent substrate 33, to protect the p-type Si substrate 11 under the film 28. The film 28, therefore, will be referred to as the shading film 28.

The third metal film 30 is sectioned into a rectangle allocated for each pixel and functions as a reflective pixel electrode to reflect the read light L coming from the transparent substrate 33 and make the reflected light emanate from the transparent substrate 33. The film 30 will be referred to as the reflective pixel electrode 30.

On each reflective pixel electrode 30, a liquid crystal 31 is sealed. On the liquid crystals 31, a transparent common electrode (counter electrode) 32 is formed on the bottom surface of the transparent substrate (glass substrate) 33. Namely, the reflective pixel electrodes 30 and the transparent common electrode 32 face each other on opposite sides of the liquid crystals 31. The reflective pixel electrodes 30 are arranged in a matrix, and the transparent common electrode 32 serves for all reflective pixel electrodes 30. Namely, the common electrode 32 is not sectioned pixel by pixel.

The gate electrode 16 of the MOSFET 14 is connected to agate line 45 (FIGS. 3, 4A, and 4B), which is made of polysilicon and is integral with the gate electrode 16. The source contact (source electrode) 19 of the MOSFET 14 is connected to a signal line 41 (FIGS. 3, 4A, and 4B) arranged on the first metal film 26. The drain contact (drain electrode) 21 of the MOSFET 14 is connected to the reflective pixel electrode 30 through the first and second metal films 26 and 28. The capacitor electrode 24 of the hold capacitor C is connected to the reflective pixel electrode 30 through a capacitor electrode contact 34 made of aluminum wiring and the first and second metal films 26 and 28.

In FIG. 2A taken along a plane parallel to the surface of FIG. 1, a $p^+$ electrode 35 is formed on the $p^-$ well region 12.

On the p+ electrode 35, a well potential contact 36 is formed from aluminum wiring. The contact 36 is connected to a well line 42 (FIG. 3) on the first metal film 26.

In FIG. 2B taken along a plane parallel to the surface of FIG. 1, a common potential contact 37 is formed from aluminum wiring on the diffusion capacitor electrode 22 of the hold capacitor C. The contact 37 is connected to a common line 43 (FIG. 3) on the first metal film 26.

FIG. 3 is a plan view showing the pixel shown in FIG. 1.

In FIG. 3, the source contact (source electrode) 19, gate electrode 16, drain contact (drain electrode) 21 corresponding to the source S, gate G, and drain D of the MOSFET 14, respectively, are horizontally aligned at an upper left part of FIG. 3. Below the upper left part, the large rectangular diffusion capacitor electrode 22 of the hold capacitor C is arranged. Consequently, the rectangular reflective pixel electrode 30 occupies a large area.

The signal line 41 connected to the source contact (source electrode) 19, the well line 42 connected to the well potential contact 36, and the common line 43 connected to the common potential contact 37 are also connected to other pixels that are arranged in the same column where the pixel of FIG. 3 is arranged. Between the signal line 41 and the well line 42, a connection line 44 that is connected to the drain contact 21 located thereabove and the lower capacitor electrode contact 34 located therebelow runs substantially in parallel with the signal line 41, well line 42, and common line 43 within the area of the pixel in question. The gate line 45 connected to the gate electrode 16 is also connected to other pixels that are arranged in the same row where the pixel in question is present.

According to the reflective LCD 10A of the prior art, a plurality of pixels each having the structure of FIG. 1 are arranged in columns and rows to form a matrix on the p-type Si substrate 11. An active matrix drive circuit 50A is provided for driving such a matrix of pixels. The drive circuit 50A will be explained with reference to FIGS. 4A and 4B.

FIG. 4A is a block diagram explaining the active matrix drive circuit 50A for the reflective LCD 10A, and FIG. 4B shows a model of a transistor part of the drive circuit 50A.

According to the active matrix drive circuit 50A shown in FIGS. 4A and 4B for the reflective LCD 10A of the prior art, the MOSFET (switching element) 14, the reflective pixel electrode 30 connected to the MOSFET 14, and the hold capacitor C connected to the MOSFET 14 form a pixel. The pixels are arranged in columns and rows to form a matrix on the p-type Si substrate (semiconductor substrate) 11. As shown in FIG. 1, the common electrode 32 formed on the transparent substrate 33 faces the reflective pixel electrodes 30, and the liquid crystals 31 are sealed between the reflective pixel electrodes 30 and the common electrode 32.

To specify one of the pixels, a horizontal shift register circuit 51 is extended in a horizontal (left-to-right) direction and a vertical shift register circuit 54 is extended in a vertical (top-to-bottom) direction.

From the horizontal shift register circuit 51, the signal lines 41 are vertically extended for the pixel columns, respectively, through video switches 52. For the sake of simplicity, FIG. 4A shows only one signal line 41 extended from the circuit 51. Between the circuit 51 and the video switch 52, the signal line 41 is connected to a video line 53. Each signal line 41 is connected to the source electrodes 19 of the MOSFETs 14 arranged in the column to which the signal line 41 is assigned.

From the vertical shift register circuit 54, the gate lines 45 are horizontally extended for the pixel rows, respectively.

For the sake of simplicity, FIG. 4A shows only one gate line 45 extended from the circuit 54. Each gate line 45 is connected to the gate electrodes 16 of the MOSFETs 14 arranged in the row to which the gate line 45 is assigned.

The drain electrode 21 of the MOSFET 14 is connected to the capacitor electrode 24 of the hold capacitor C and the reflective pixel electrode 30. The active matrix drive circuit 50A employs a known frame inversion drive technique that alternates video signals between positive and negative polarities frame by frame. For example, video signals in a frame period n are in a positive write period and those in a frame period n+1 are in a negative write period. To pass a video signal, the signal line 41 is connected to the source electrode 19 or drain electrode 21 of the MOSFET 14. In this example, the signal line 41 is connected to the source electrode 19 as mentioned above. If the signal line 41 is connected to the drain electrode 21, the source electrode 19 is connected to the capacitor electrode 24 of the hold capacitor C and the reflective pixel electrode 30.

The reflective LCD 10A of the prior art must supply a first fixed potential (hereinafter referred to as the well potential) to the MOSFET 14 and a second fixed potential (hereinafter referred to as the common potential) to the hold capacitor C.

The well potential (first fixed potential) to the MOSFET 14 is a fixed potential, for example, a voltage of 0 V and is supplied between the gate line 45 and the well line (first fixed potential line) 42. The well line 42 is connected to the well potential contact 36 (FIGS. 2A and 3) on the p+ electrode 35 (FIG. 2A) formed in the p− well region 12. When an n− well region is employed, a well potential of, for example, 15 V may be employed.

The common potential (second fixed potential) to the hold capacitor C is a fixed potential, for example, a voltage of 8.5 V and is applied between the capacitor electrode 24 of the hold capacitor C and the common line (second fixed potential line) 43. The common line 43 is connected to the common potential contact 37 (FIGS. 2B and 3) formed on the diffusion capacitor electrode 22. The common potential may have an optional voltage value to form the hold capacitor C. It may preferably be set to a center value (for example, 8.5 V) of a video signal, so that a voltage applied to the hold capacitor C may be half a source voltage. In this case, a hold capacitor withstand voltage can be half the source voltage, to make the insulating film 23 (FIG. 1) of the hold capacitor C thinner and increase capacitance. The larger the capacitance of the hold capacitor C, the more the potential on the reflective pixel electrode 30 is stabilized to prevent flickering and burning. The hold capacitor C accumulates charge according to a potential difference between the potential applied to the reflective pixel electrode 30 and the common potential, holds the accumulated voltage during an OFF state of the MOSFET 14 or an unselected period, and continuously applies the held voltage to the reflective pixel electrode 30.

To selectively drive one of the pixels by the active matrix drive circuit 50A of the reflective LCD 10A according to the prior art, video signals are sequentially supplied to the video line 53, and one of the video signals is supplied to one signal line 41 through the video switch 52. Then a MOSFET 14 positioned at an intersection of the signal line in question and a selected gate line 45 is turned on to drive the pixel.

The video signal is supplied through the signal line 41 to the selected reflective pixel electrode 30 and is written, as charge, into the hold capacitor C. At the same time, a potential difference is produced between the reflective pixel electrode 30 and common electrode 32 in response to the video signal, to modulate the optical characteristic of the liquid crystal 31. Consequently, the read light L (FIG. 1) coming from the transparent substrate 33 is modulated pixel by pixel in the liquid crystal 31, the modulated light is reflected by the reflective pixel electrode 30, and the reflected light is emitted outside from the transparent substrate 33. Therefore, unlike the transmission LCD, the reflective LCD can utilize nearly 100% of the read light L (FIG. 1), to provide finer and brighter images.

As explained with reference to FIG. 3, the reflective LCD 10A according to the prior art must arrange three lines, i.e., the signal line 41, well line 42, and common line 43 on the first metal film 26 (FIG. 1) for each pixel column to connect pixels therein. These lines or wires on the first metal film 26 (FIG. 1) make it difficult to reduce the size of each pixel. As a result, the reflective LCD 10A according to the prior art involves a matrix of large pixels on the p-type Si substrate 11.

SUMMARY OF THE INVENTION

In consideration of the problems of the prior art, an object of the present invention is to provide a reflective LCD capable of reducing the size of each pixel formed on a semiconductor substrate.

According to an aspect of the present invention, there is provided a reflective LCD having a matrix of pixels formed on a semiconductor substrate, a transparent common electrode, and liquid crystals. The pixels on the semiconductor substrate are aligned in pixel columns and pixel rows. Each of the pixels has a switching element formed in a well region of the semiconductor substrate, a reflective pixel electrode connected to the switching element, and a hold capacitor connected to the switching element. The transparent common electrode is formed on a transparent substrate and faces the reflective pixel electrodes. The liquid crystals are sealed between the reflective pixel electrodes and the transparent common electrode.

The reflective LCD includes at least two kinds of fixed potential lines formed along adjacent ones of the pixel columns, respectively. Each of the fixed potential lines is connected to the pixels in the corresponding pixel column, so that the fixed potential lines complementarily supply at least two kinds of fixed potentials to every pixel in the adjacent pixel columns.

According to this aspect of the present invention, the pixels arranged on the semiconductor substrate are aligned in columns and rows. At least two kinds of fixed potential lines are formed along adjacent ones of the pixel columns, respectively. Each of the fixed potential lines is connected to the pixels in the corresponding pixel column, so that the fixed potential lines may complementarily supply at least two kinds of fixed potentials to every pixel in the adjacent pixel columns. Compared with the prior art, this aspect can reduce the number of fixed potential lines formed along the pixel columns, to thereby reduce the area of each pixel on a semiconductor substrate.

According to another aspect of the present invention, there is provided a reflective LCD having a matrix of pixels formed on a semiconductor substrate, a transparent common electrode, and liquid crystals. The pixels on the semiconductor substrate are aligned in pixel columns and pixel rows. Each of the pixels has a switching element formed in a well region of the semiconductor substrate, a reflective pixel electrode connected to the switching element, and a hold capacitor connected to the switching element. The transparent common electrode is formed on a transparent substrate and faces the reflective pixel electrodes. The liquid crystals are sealed between the reflective pixel electrodes and the transparent common electrode.

The pixels include first pixels aligned in first-pixel columns and second pixels aligned in second-pixel columns. The first- and second-pixel columns are alternated in a horizontal (left-to-right) direction. The reflective LCD has a first fixed potential line formed along each of the first-pixel columns and connected to the well regions of the pixels in the first-pixel column, to supply a first fixed potential to the pixels in the first-pixel column and to the pixels in an adjacent one of the second-pixel columns through the well regions of the first-pixel column, and a second fixed potential line formed along each of the second-pixel columns and connected to diffusion capacitor electrodes formed on the hold capacitors of the pixels in the second-pixel column, to supply a second fixed potential to each pixel in the second-pixel column and to the pixels in an adjacent one of the first-pixel columns through the diffusion capacitor electrodes of the second-pixel column.

According to this aspect of the present invention, the pixels arranged on the semiconductor substrate include first pixels aligned in first-pixel columns and second pixels aligned in second-pixel columns. The first- and second-pixel columns are alternated in a horizontal direction. A first fixed potential line is formed along each of the first-pixel columns and is connected to the well regions of the pixels in the first-pixel column, to supply a first fixed potential to the pixels in the first-pixel column and to the pixels in an adjacent one of the second-pixel columns through the well regions of the first-pixel column. A second fixed potential line is formed along each of the second-pixel columns and is connected to diffusion capacitor electrodes formed on the hold capacitors of the pixels in the second-pixel column, to supply a second fixed potential to each pixel in the second-pixel column and to the pixels in an adjacent one of the first-pixel columns through the diffusion capacitor electrodes of the second-pixel column. Compared with the prior art, this aspect can reduce the number of first and second fixed potential lines formed along pixel columns, to thereby allow pixels on a semiconductor substrate to be smaller.

According to still another aspect of the present invention, there is provided a reflective LCD having a matrix of pixels formed on a semiconductor substrate, a transparent common electrode, and liquid crystals. The pixels on the semiconductor substrate are aligned in pixel columns and pixel rows. Each of the pixels has a switching element formed in a well region of the semiconductor substrate, a reflective pixel electrode connected to the switching element, and a hold capacitor connected to the switching element. The transparent common electrode is formed on a transparent substrate and faces the reflective pixel electrodes. The liquid crystals are sealed between the reflective pixel electrodes and the transparent common electrode.

The pixels include first pixels aligned in first-pixel columns, second pixels aligned in second-pixel columns, and at least one kind of third pixels aligned in third-pixel columns. The first- and second-pixel columns are alternated in a horizontal direction with the third-pixel column interposed between the adjacent first- and second-pixel columns. The reflective LCD includes a first fixed potential line formed along each of the first-pixel columns and connected to the well regions of the pixels in the first-pixel column, to supply a first fixed potential to the pixels in the first-pixel column, to the pixels in an adjacent one of the second-pixel columns through the well regions of the first-pixel column, and to the pixels in an adjacent one of the third-pixel columns through the well regions of the first-pixel column. Also included is a second fixed potential line formed along each of the second-pixel columns and connected to diffusion capacitor electrodes formed on the hold capacitors of the pixels in the second-pixel column, to supply a second fixed potential to the pixels in the second-pixel column, to the pixels in an adjacent one of the first-pixel columns through the diffusion capacitor electrodes of the second-pixel column, and to the pixels in an adjacent one of the third-pixel columns through the diffusion capacitor electrodes of the second-pixel column. Further included is a pattern line formed along each of the third-pixel columns or formed within each of the third pixels. The pattern line is connected to none of the first and second fixed potentials.

According to this aspect of the present invention, the pixels include first pixels aligned in first-pixel columns, second pixels aligned in second-pixel columns, and at least one kind of third pixels aligned in third-pixel columns. The first- and second-pixel columns are alternated in a horizontal direction with the third-pixel column interposed between the adjacent first- and second-pixel columns. A first fixed potential line is formed along each of the first-pixel columns and is connected to the well regions of the pixels in the first-pixel column, to supply a first fixed potential to the pixels in the first-pixel column, to the pixels in an adjacent one of the second-pixel columns through the well regions of the first-pixel column, and to the pixels in an adjacent one of the third-pixel columns through the well regions of the first-pixel column. A second fixed potential line is formed along each of the second-pixel columns and is connected to diffusion capacitor electrodes formed on the hold capacitors of the pixels in the second-pixel column, to supply a second fixed potential to the pixels in the second-pixel column, to the pixels in an adjacent one of the first-pixel columns through the diffusion capacitor electrodes of the second-pixel column, and to the pixels in an adjacent one of the third-pixel columns through the diffusion capacitor electrodes of the second-pixel column. A pattern line is formed along each of the third-pixel columns or is formed within each of the third pixels. The pattern line is connected to none of the first and second fixed potentials. Compared with the prior art, this aspect can reduce the number of first and second fixed potential lines formed along the pixel columns, to thereby allow pixels on a semiconductor substrate to be smaller. Arranging the third-pixel column between the first- and second-pixel columns improves the yields of reflective LCDs.

The nature, principle and utility of the invention will become more apparent from the following detailed description when read in conjunction with the accompanying drawings.

BRIEF DESCRIPTION OF THE DRAWINGS

In the accompanying drawings:

FIGS. 5A and 5B are enlarged plan views showing pixels A and B formed on a semiconductor substrate in a reflective LCD according to an embodiment of the present invention, in which FIG. 5A shows the pixel A and FIG. 5B the pixel B;

FIGS. 6A and 6B are views explaining the pixel A of FIG. 5A, in which FIG. 6A is a sectional view taken along a plane parallel to the surface of FIG. 1, to show a p⁻ well region and FIG. 6B is a sectional view taken along a plane parallel to the surface of FIG. 1, to show a hold capacitor;

FIGS. 7A and 7B are views explaining the pixel B of FIG. 5B, in which FIG. 7A is a sectional view taken along a plane parallel to the surface of FIG. 1, to show a p⁻ well region and FIG. 7B is a sectional view taken along a plane parallel to the surface of FIG. 1, to show a hold capacitor;

DETAILED DESCRIPTION OF EMBODIMENTS

Reflective LCDs according to various embodiments of the present invention will be described with reference to FIGS. 1, 4A, and 4B explained already, as well as FIGS. 5A to 12.

Figure 5A:
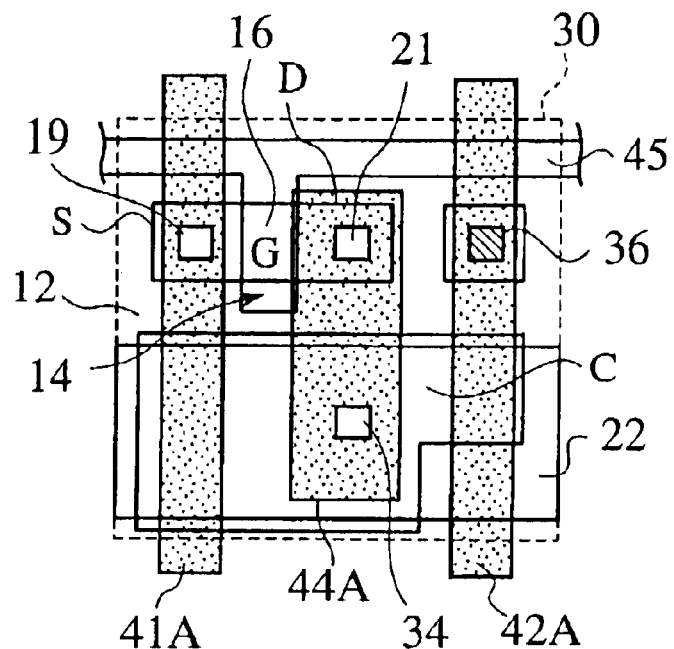
Figure 5B:
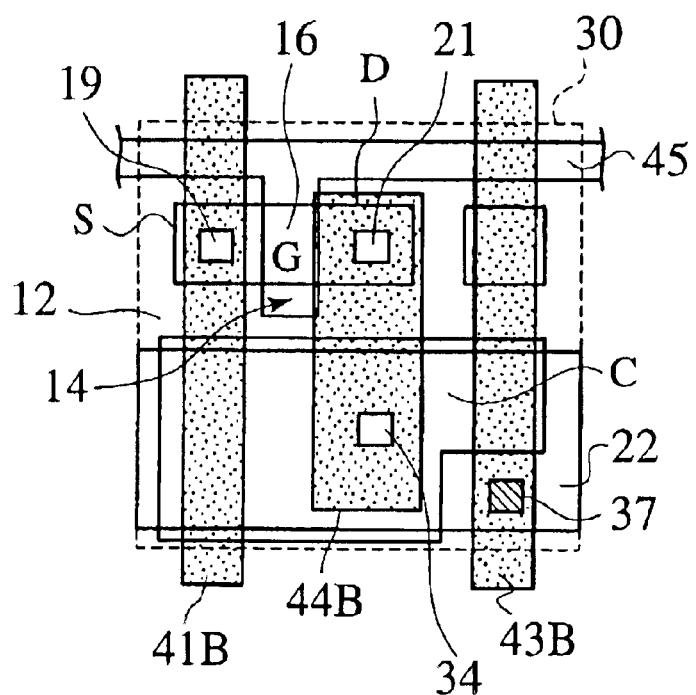

FIGS. 5A and 5B are enlarged plan views showing pixels A and B formed on a semiconductor substrate in a reflective LCD according to an embodiment of the present invention, in which FIG. 5A shows the pixel A and FIG. 5B the pixel B.

Figure 1:
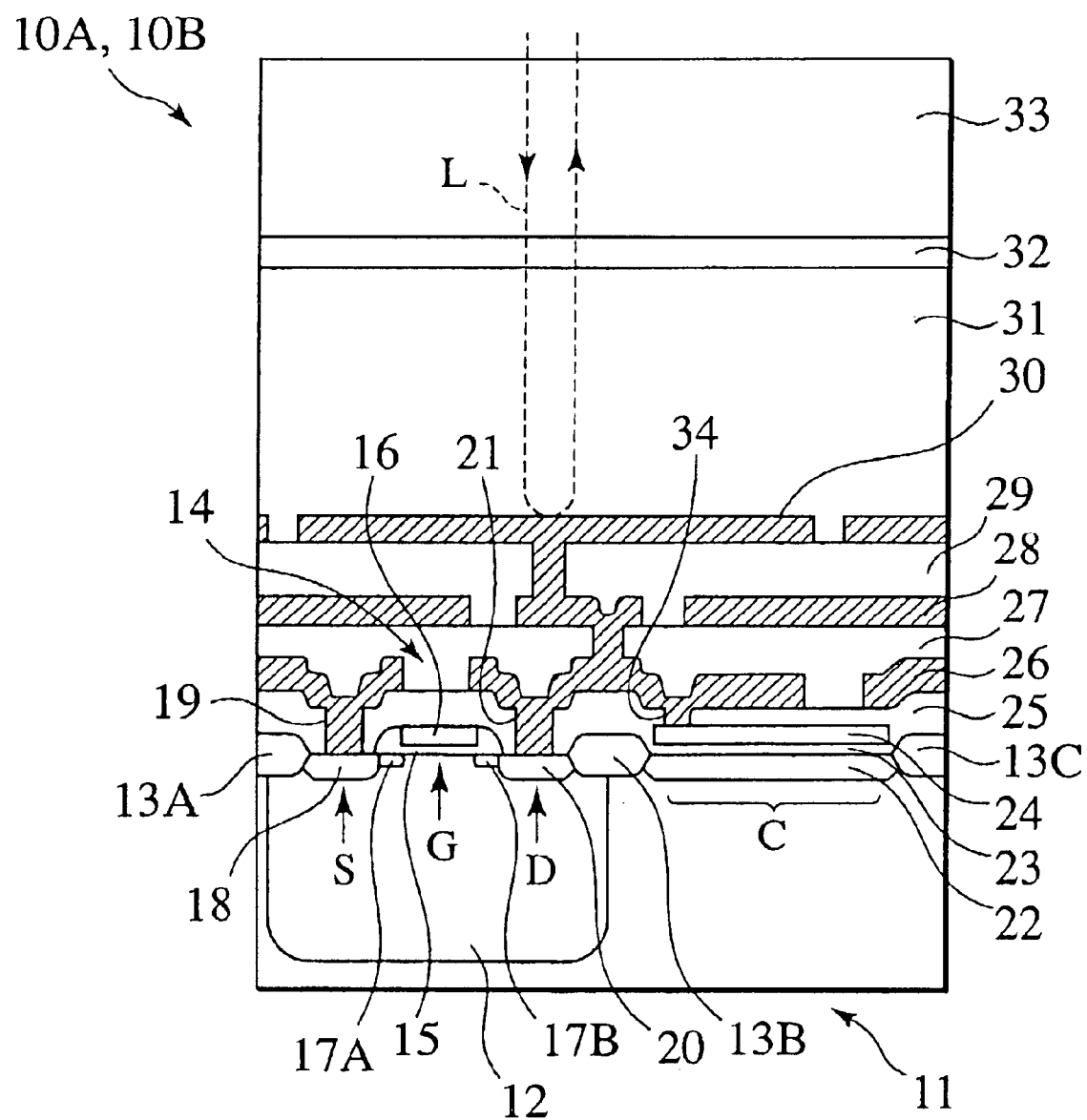
FIG. 1 is an enlarged sectional view showing a model of a pixel in a reflective LCD.
Figure 2A:
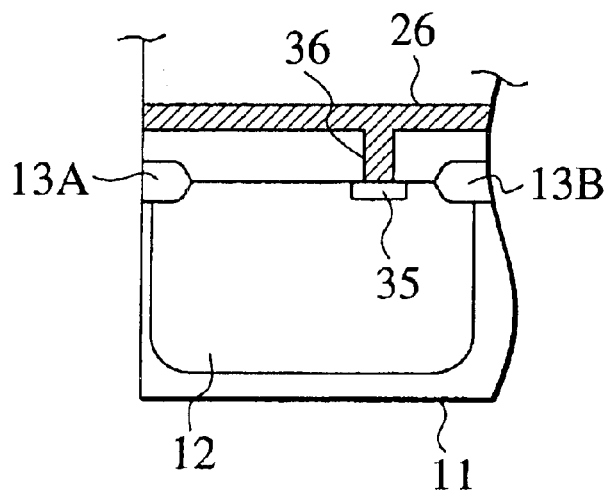
FIG. 2A is a sectional view taken along a plane parallel to the surface of FIG. 1, showing a p⁻ well region.
Figure 2B:
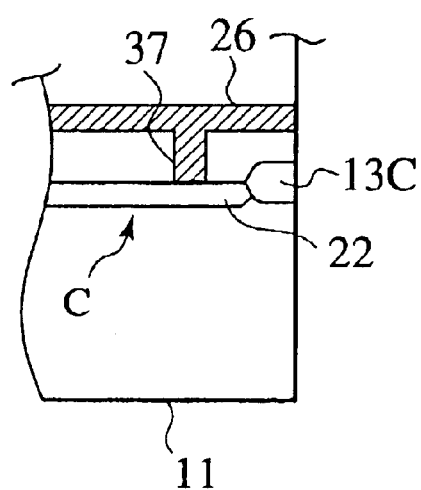
FIG. 2B is a sectional view taken along a plane parallel to the surface of FIG. 1, showing a hold capacitor.
Figure 6A:
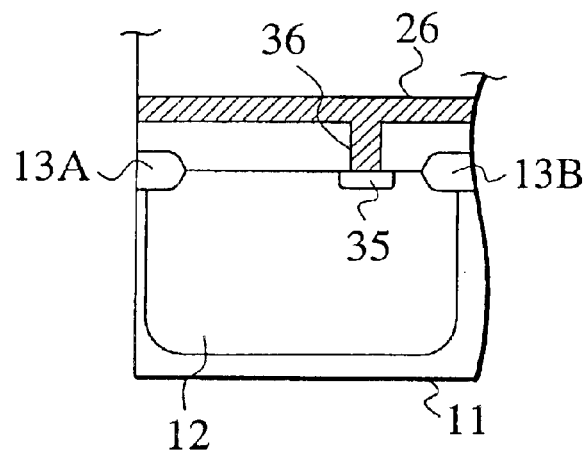
Figure 6B:
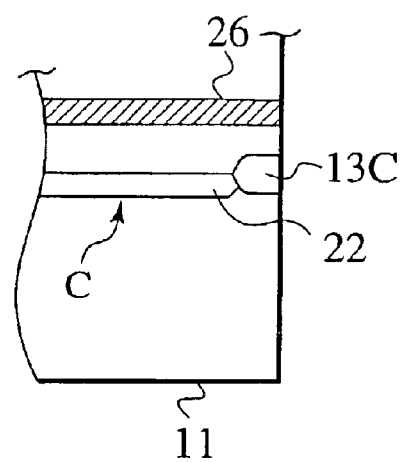

FIGS. 6A and 6B are views explaining the pixel A of FIG. 5A, in which FIG. 6A is a sectional view taken along a plane parallel to the surface of FIG. 1, to show a p⁻ well region and FIG. 6B is a sectional view taken along a plane parallel to the surface of FIG. 1, to show a hold capacitor.

Figure 7A:
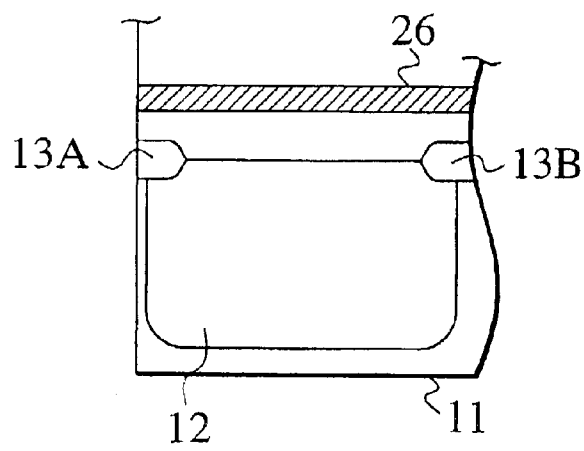
Figure 7B:
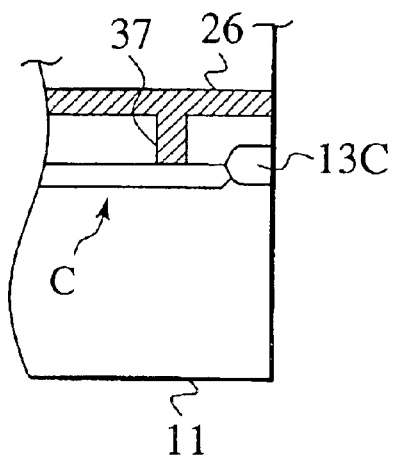

FIGS. 7A and 7B are views explaining the pixel B of FIG. 5B, in which FIG. 7A is a sectional view taken along a plane parallel to the surface of FIG. 1, to show a p⁻ well region and FIG. 7B is a sectional view taken along a plane parallel to the surface of FIG. 1, to show a hold capacitor.

Figure 8:
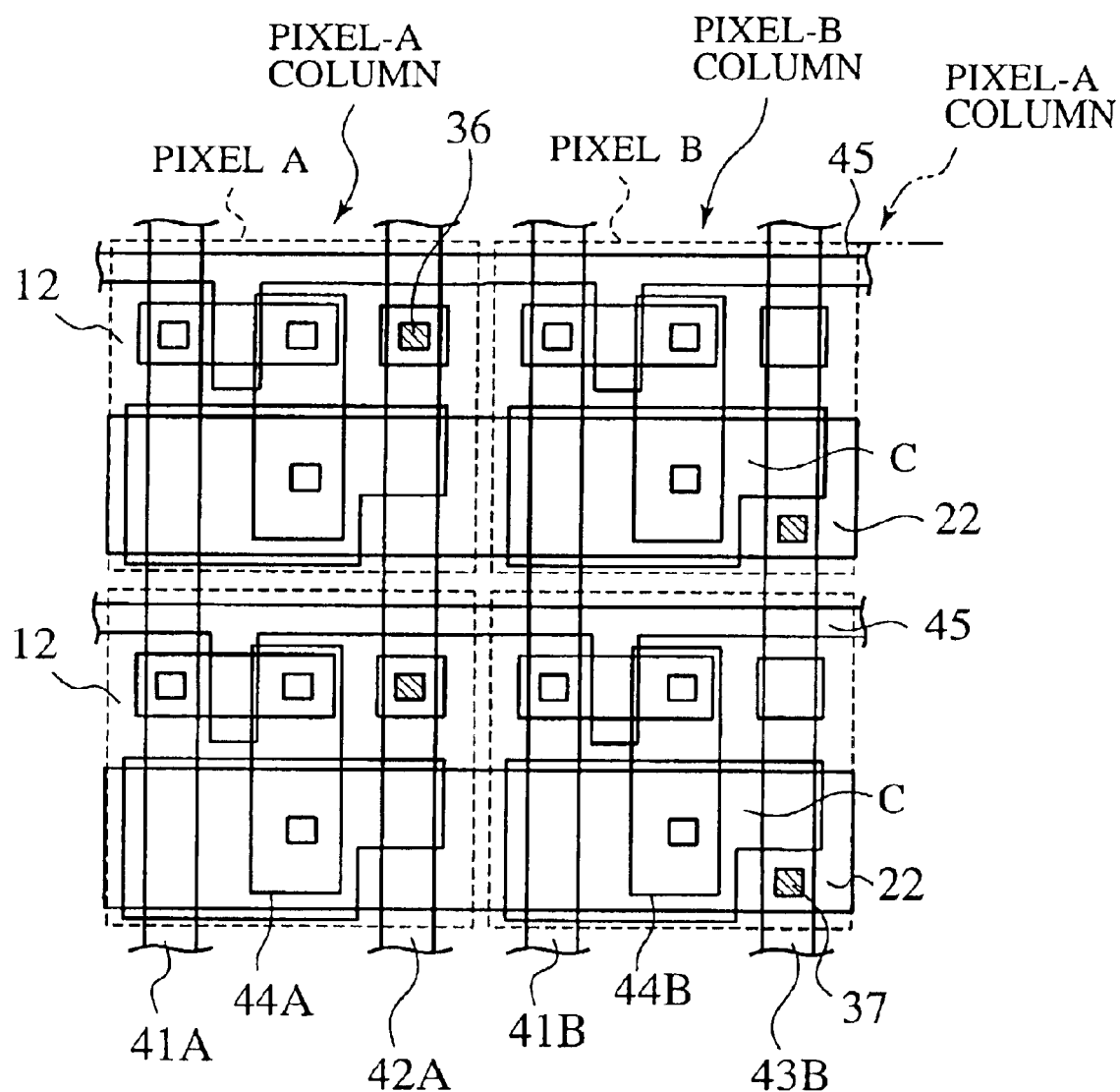
FIG. 8 is a plan view showing pixel-A and pixel-B columns formed on a semiconductor substrate in a reflective LCD according to an embodiment of the present invention.

FIG. 8 is a plan view showing pixel-A and pixel-B columns formed on a semiconductor substrate in a reflective LCD according to an embodiment of the present invention.

Figure 3:
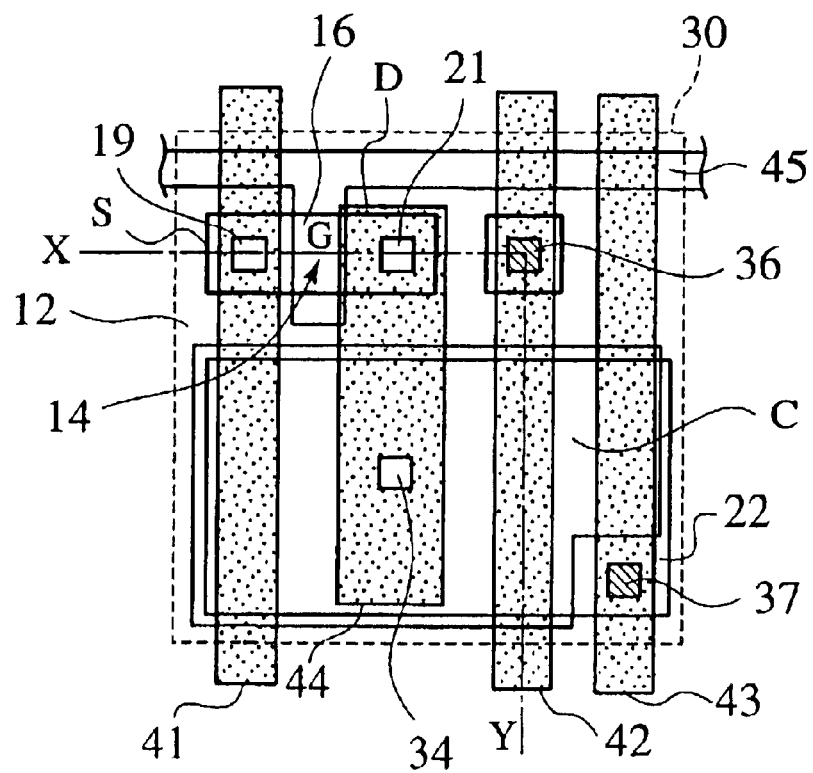
FIG. 3 is an enlarged plan view showing a model of a pixel in a reflective LCD according to a prior art.

Pixels in a reflective LCD according to an embodiment of the present invention involve, like the prior art of FIG. 3, signal lines 41, well lines 42, and common lines 43 among which the well lines 42 and common lines 43 are differently arranged from those of the prior art. The basic structure of each pixel of the embodiment is similar to that of the reflective LCD 10A of the prior art of FIG. 1, and therefore, the reflective LCD of the embodiment is represented with a reference mark "10B" in FIG. 1.

An active matrix drive circuit for the reflective LCD 10B according to the embodiment of the present invention resembles the active matrix drive circuit 50A of the prior art explained with reference to FIGS. 4A and 4B except that the embodiment employs a different method in supplying a well potential and a common potential. The active matrix drive circuit of the embodiment is represented with a reference mark "50B" in FIG. 4A.

Parts of the reflective LCD 10B of the embodiment that correspond to those of the prior art are represented with like reference marks and are explained only when needed. Parts specific to the embodiment are represented with new reference marks and are explained in detail.

In FIG. 1 that is an enlarged view showing one pixel in the reflective LCD 10B, a semiconductor substrate 11 serving as a base is a p-type Si substrate. This substrate may be an n-type Si substrate. In the semiconductor substrate (hereinafter referred to as the p-type Si substrate) 11, a p⁻ well region 12 is isolated within the pixel by left and right field oxide films 13A and 13B. In the p⁻ well region 12, a MOSFET 14 is formed to serve as a switching element.

Figure 4A:
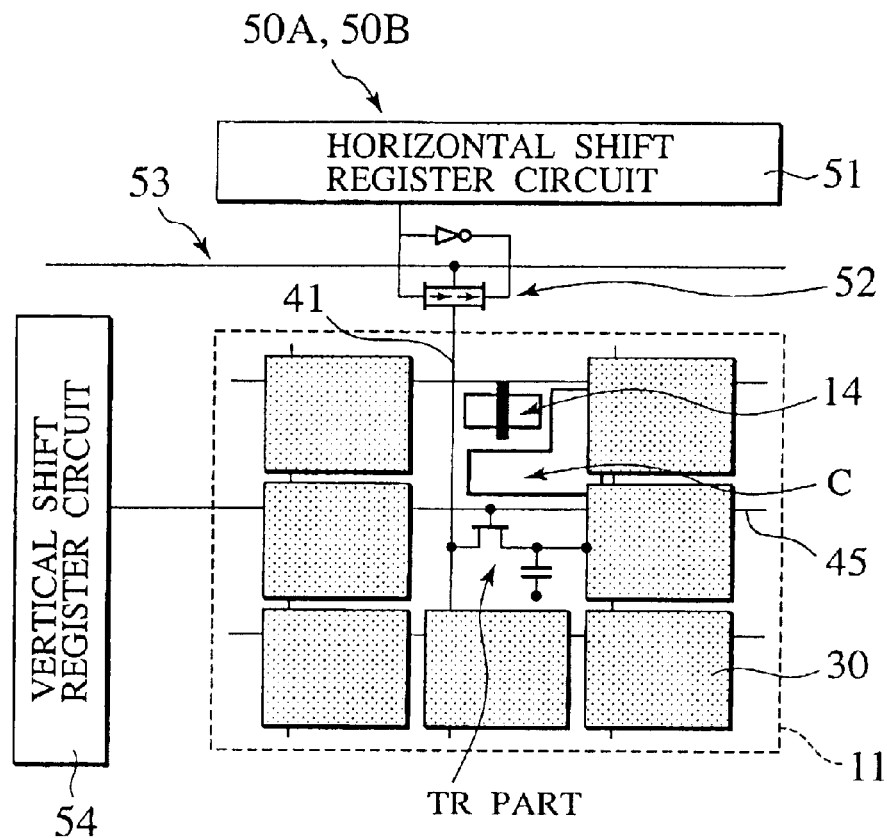
FIG. 4A is a block diagram explaining an active matrix drive circuit for a reflective LCD.
Figure 4B:
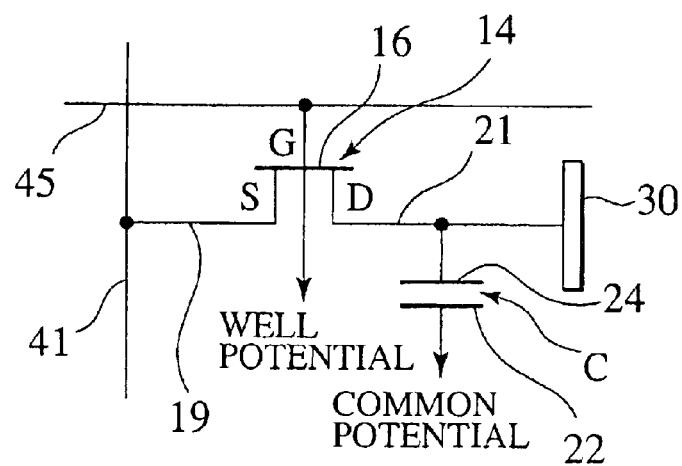
FIG. 4B is an enlarged view showing a model of a transistor part of the circuit of FIG. 4A.

In FIGS. 4A and 4B, the active matrix drive circuit 50B includes, in each pixel, the MOSFET 14, a reflective pixel electrode 30 connected to the MOSFET 14, and a hold capacitor C connected to the MOSFET 14. The pixels on the p-type Si substrate 11 are arranged in a matrix of columns and rows. Facing the reflective pixel electrodes 30 is a transparent common electrode 32 formed on a transparent substrate 33. Between the reflective pixel electrodes 30 and the common electrode 32, liquid crystals 31 are sealed. These arrangements are the same as those of the prior art.

The difference of the embodiment from the prior art will be explained with reference to FIGS. 5A to 7B. In FIGS. 5A and 5B, the pixels on the p-type Si substrate 11 of the reflective LCD 10B of the embodiment include first pixels A (FIG. 5A) and second pixels B (FIG. 5B). Namely, the reflective LCD 10B of the embodiment has two kinds of pixel patterns.

In the pixel A (first pixel) of FIG. 5A, the MOSFET 14 has a source S, gate G, and drain D that are horizontally aligned at an upper left part of FIG. 5A. For these source S, gate G, and drain D, there are arranged a source contact (source electrode) 19, gate electrode 16, and a drain contact (drain electrode) 21, respectively. Below these elements, there is a rectangular diffusion capacitor electrode 22 of a hold capacitor C. This diffusion capacitor electrode 22 is smaller than that of the prior art, and therefore, the rectangular reflective pixel electrode 30 of the pixel A can be smaller than that of the prior art.

For each column of the pixels A, a signal line 41A is formed. More precisely, the signal line 41A is arranged along each column of the pixels A and is connected to the source contacts (source electrodes) 19 of the pixels A in the column. Further, a well line 42A is arranged along each column of the pixels A and is connected to well potential contacts 36 of the pixels A in the column. The pixel-A column has no common line. Between the signal line 41A and the well line 42A, a connection line 44A is formed within each pixel and is connected to the drain contact 21 located thereabove and a capacitor electrode contact 34 located therebelow. The connection line 44A runs substantially in parallel with the signal line 41A and well line 42A. A gate line 45 is connected to the gate electrode 16 and is also connected to other pixels that are in the same row where the pixel in question is present.

In FIG. 6A that shows a cross-sectional plane of the p⁻ well region 12 parallel to the surface of FIG. 1, the pixel A has a p⁺ electrode 35 on the p⁻ well region 12, and on the p⁺ electrode 35, the well potential contact 36 made of aluminum wiring. The well potential contact 36 is connected to the well line 42A (FIG. 5A) on a first metal film 26.

In FIG. 6B that shows a cross-sectional plane of the hold capacitor C parallel to the surface of FIG. 1, the pixel A has no common potential contact of aluminum wiring on the diffusion capacitor electrode 22 of the hold capacitor C. Namely, the pixel A has no common line on the first metal film 26.

Next, like the pixel A, the pixel B of FIG. 5B has the MOSFET 14 whose source S, gate G, and drain D are horizontally aligned at an upper left part of FIG. 5B. For these source S, gate G, and drain D, there are arranged a source contact (source electrode) 19, a gate electrode 16, and a drain contact (drain electrode) 21, respectively. Below these elements, the rectangular diffusion capacitor electrode 22 of the hold capacitor C is smaller than that of the prior art. As a result, the rectangular reflective pixel electrode 30 of the pixel B can be smaller than that of the prior art.

Like the pixels A, the pixels B in each pixel-B column are provided with a signal line 41B. The signal line 41B extends along each pixel-B column (FIG. 8) and connects to the source contacts (source electrodes) 19 of the pixels B in the pixel-B column. Unlike the pixel-A column, a common line 43B is arranged along each pixel-B column and is connected to the common potential contacts 37 of the pixels B in the pixel-B column. The pixel-B columns have no well line. Between the signal line 41B and the common line 43B, a connection line 44B is formed within each pixel B and is connected to the drain contact 21 located thereabove and capacitor electrode contact 34 located therebelow of the pixel B. The connection line 44B runs substantially in parallel with the signal line 41B and common line 43B. Like that of the pixel A, the gate electrode 16 of the pixel B is connected to a gate line 45, which is connected to other pixels in the same row where the pixel B in question is present.

In FIG. 7A that shows a cross-sectional plane of the p⁻ well region 12 parallel to the surface of FIG. 1, the pixel B has no p⁺ electrode on the p⁻ well region 12, and therefore, there is no well potential contact. Namely, there is no well line on the first metal film 26 for the pixel B.

In FIG. 7B that shows a cross-sectional plane of the hold capacitor C parallel to the surface of FIG. 1, the pixel B has a common potential contact 37 of aluminum wiring on the diffusion capacitor electrode 22 of the hold capacitor C. The common potential contact 37 is connected to the common line 43B (FIG. 5B) on the first metal film 26.

FIG. 8 shows an example of arrangement of the pixels A and B on the p-type Si substrate 11.

On the p-type Si substrate 11 in FIG. 8, the pixels A (first pixels) are arranged in a pixel-A column, and the pixels B (second pixels) are arranged in a pixel-B column. The pixel-A and pixel-B columns are alternately arranged in a horizontal direction. Namely, the pixels on the p-type Si substrate 11 include the pixels A that are aligned in a vertical (top-to-bottom) direction into the pixel-A columns and the pixels B that are aligned in the vertical direction into the pixel-B columns. The pixel-A columns and pixel-B columns are arranged adjacent to each other and alternated in a horizontal (left-to-right) direction. For the sake of simplicity, FIG. 8 shows only one pixel-A column containing two pixels A and one pixel-B column containing two pixels B.

Each pixel-A column is provided with the signal line 41A connected to the pixels A in the pixel-A column, and each pixel-B column is provided with the signal line 41B connected to the pixels B in the pixel-B column. The connection line 44A is formed within each pixel A substantially in parallel with the signal line 41A, and the connection line 44B is formed within each pixel B substantially in parallel with the signal line 41B. In each row of the alternating pixels A and B, the gate line 45 is connected to these pixels.

In each pixel-A column, the well line 42A is connected to the well potential contacts 36 of the p+ electrodes 35 (FIG. 6A) on the p− well regions 12 of the pixels A. The pixel-A column, however, has no common line. On the other hand, in each pixel-B column, the common line 43B is connected to the common potential contacts 37 of the diffusion capacitor electrodes 22 on the hold capacitors C of the pixels B. The pixel-B column, however, has no well line.

With these arrangements, the well line 42A supplies a well potential to the pixel-A column. At this time, a common potential for the pixel-A column is supplied through the diffusion capacitor electrodes 22 of the hold capacitors C of the adjacent pixel-B column. Generally, each diffusion capacitor electrode 22 of the hold capacitor C formed by implanting ions into the p-type Si substrate 11 has larger resistance compared with an aluminum electrode. This resistance, however, is sufficiently low in a distance of several tens of microns, to cause no problem in supplying the common potential to the pixel-A column.

On the other hand, a common potential for the pixel-B column is supplied from the common line 43B. At this time, a well potential for the pixel-B column is supplied through the p− well regions 12 of the adjacent pixel-A column. Generally, the p+ electrode 35 (FIG. 6A) formed by implanting ions into the p− well region 12 has larger resistance compared with an aluminum electrode. This resistance, however, is sufficiently low in a distance of several tens of microns, to cause no problem in supplying the well potential to the pixel-B column.

In this way, the embodiment arranges the well line (first fixed potential line) 42A for each pixel-A column, and the common line (second fixed potential line) 43B for each pixel-B column, to supply the well potential (first fixed potential) and common potential (second fixed potential) to the pixel-A and pixel-B columns complementarily from the well line 42A connected to the pixel-A column and the common line 43B connected to the pixel-B column. This results in reducing the number of aluminum wires on the first metal film 26 (FIG. 1) and minimizing the area of each pixel. As a result, pixels on the p-type Si substrate 11 can be made finer.

The embodiment mentioned above employs a p-type Si substrate as the semiconductor substrate 11 and supplies two fixed potentials, i.e., the well potential (first fixed potential) and common potential (second fixed potential) to pixels in adjacent pixel-A and pixel-B columns complementarily from the adjacent pixel-A and pixel-B columns. The present invention is not limited to complementarily supplying two fixed potentials. The present invention can complementarily supply more than two fixed potentials.

For example, if the semiconductor substrate 11 of FIG. 1 is an n-type Si substrate, three fixed potentials must be supplied to each pixel. Namely, a p-well potential (first fixed potential), a common potential (second fixed potential), and an n-well potential (third fixed potential) are needed. To supply these potentials to each pixel in each column, a prior art must provide each pixel column with a p-well line (first fixed potential line) to supply the p-well potential, a common line (second fixed potential line) to supply the common potential, and an n-well line (third fixed potential line) to supply the n-well potential. On the other hand, the present invention with the above-mentioned technique prepares only one fixed potential line for each pixel column. More precisely, the present invention distributes two or more fixed potential lines for supplying two or more fixed potentials to two or more pixel columns and connects the fixed potential lines to the pixels of the pixel columns, respectively, so that the two or more fixed potentials are supplied to each pixel complementarily from the adjacent or adjoining pixel columns. For example, the p-well potential, common potential, and n-well potential are supplied to each pixel complementarily from the first to third fixed potential lines. This realizes finer pixels to be formed on a semiconductor substrate.

The technique of supplying the well potential and common potential to the pixel-A and pixel-B columns complementarily from the pixel-A and pixel-B columns may be expanded to interposing a pixel-M or pixel-N column to which no well potential line nor common potential line is connected between the pixel-A column and the pixel-B column. This technique will briefly be explained with reference to FIGS. 9 to 12.

Figure 9:
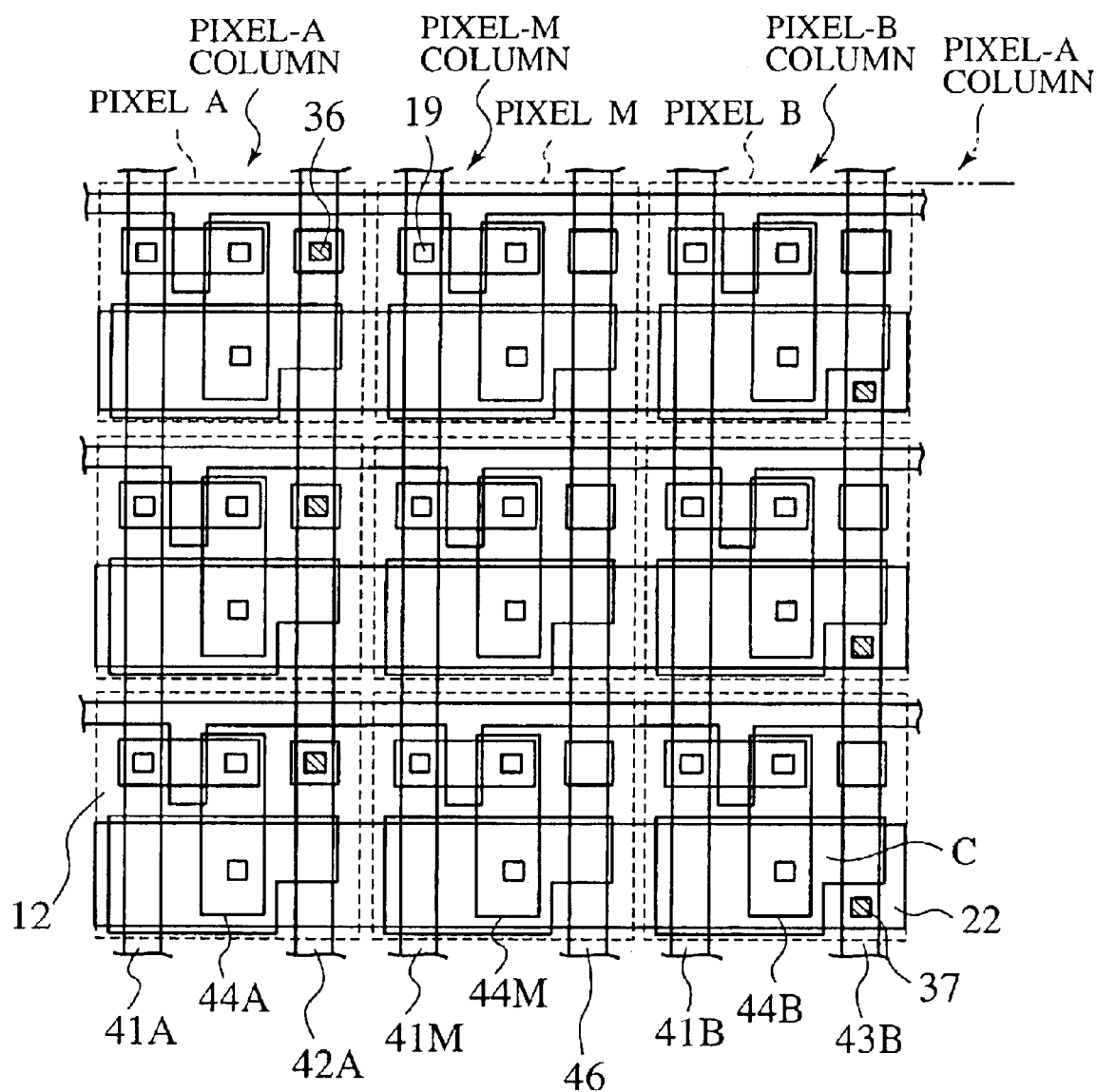
FIG. 9 is a plan view showing a first 3-column arrangement including a pixel-A column, pixel-M column, and pixel-B column in a reflective LCD according to an embodiment of the present invention.
Figure 10:
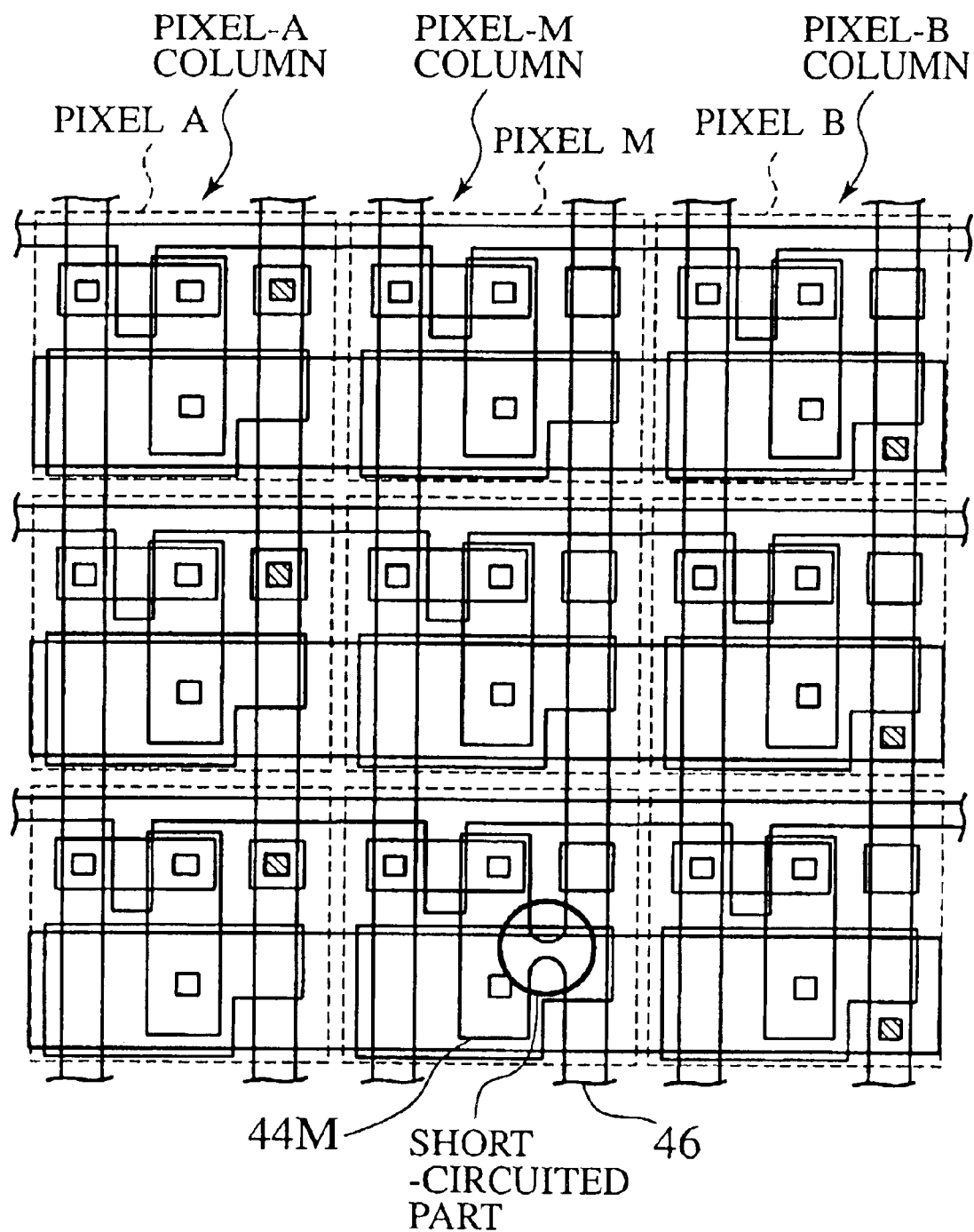
FIG. 10 is a plan view showing the first 3-column arrangement of FIG. 9 with a short-circuited aluminum wire caused by, for example, dust on the pixel-M column.

FIG. 9 is a plan view showing a reflective LCD according to another embodiment of the present invention, having a first 3-column arrangement. This arrangement includes pixel-A, pixel-M, and pixel-B columns formed on a semiconductor substrate. FIG. 10 is a plan view showing a short-circuited aluminum wire caused by, for example, dust on the pixel-M column.

Figure 11:
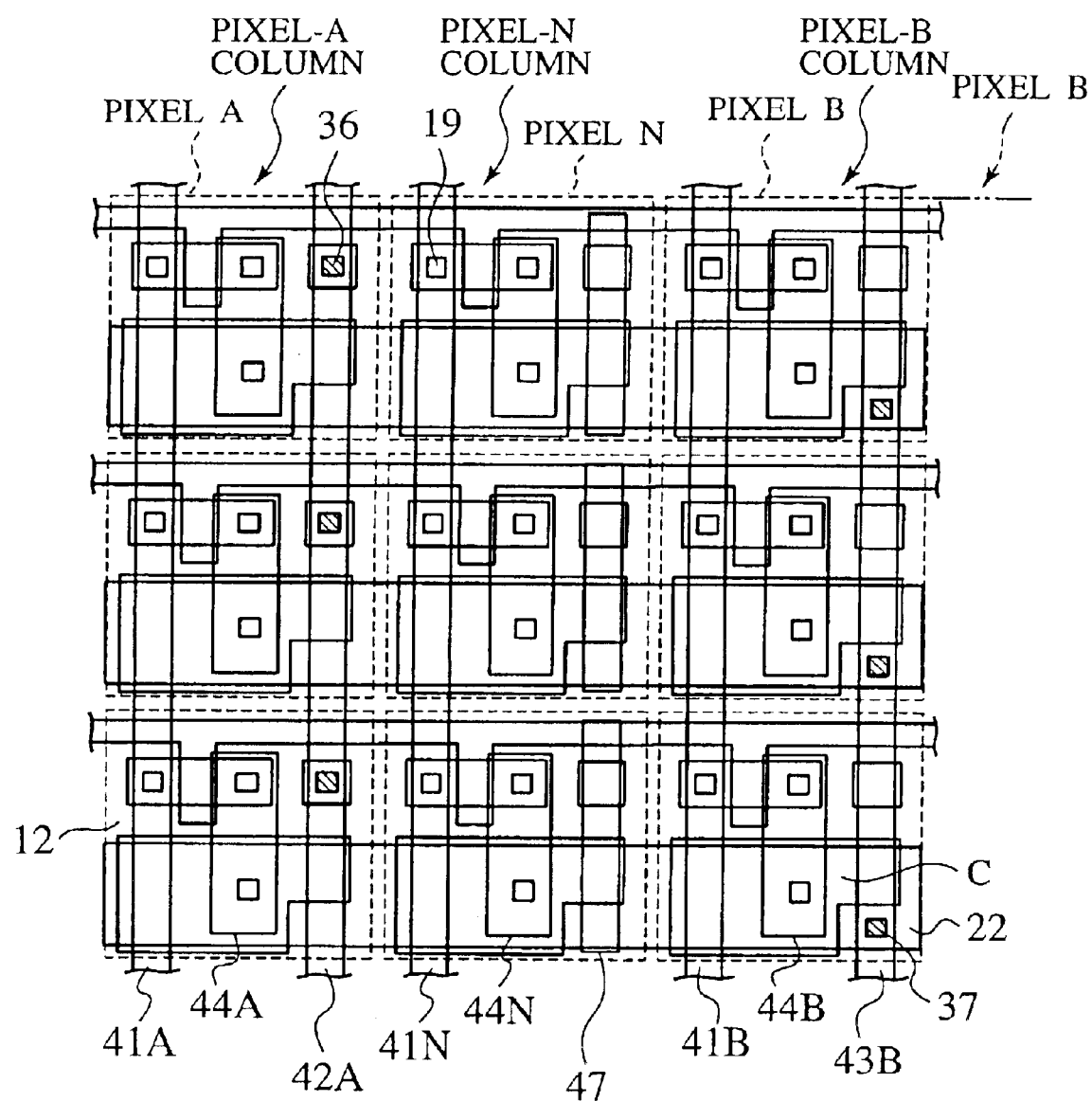
FIG. 11 is a plan view showing a second 3-column arrangement including a pixel-A column, pixel-N column, and pixel-B column in a reflective LCD according to an embodiment of the present invention.
Figure 12:
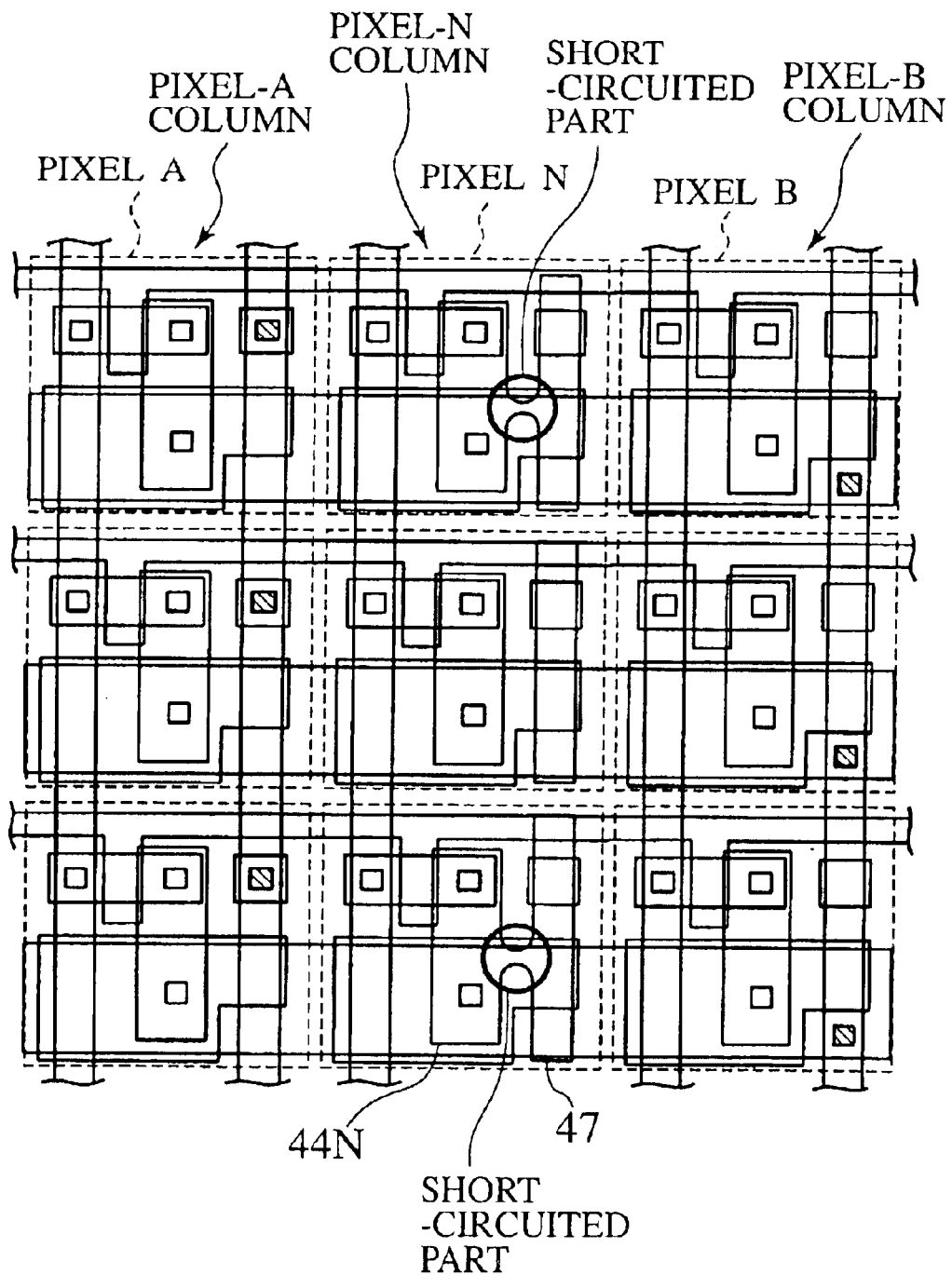
FIG. 12 is a plan view showing the second 3-column arrangement of FIG. 11 with short-circuited aluminum wires caused by, for example, dust on the pixel-N column.

FIG. 11 is a plan view showing a reflective LCD according to still another embodiment of the present invention, having a second 3-column arrangement. This arrangement includes pixel-A, pixel-N, and pixel-B columns formed on a semiconductor substrate. FIG. 12 is a plan view showing short-circuited aluminum wires caused by, for example, dust on the pixel-N column.

In FIG. 9, the first 3-column arrangement forms pixels on a p-type Si substrate 11 such that pixels A (first pixels) are vertically aligned in a pixel-A column(first-pixel column), pixels B (second pixels) in a pixel-B column (second-pixel column), and pixels M (third pixels) in a pixel-M column (third-pixel column). These pixel columns are sequentially arranged in a horizontal direction in order of the pixel-A column, pixel-M column, pixel-B column, pixel-A column, and the like. Namely, the pixel-M column is sandwiched between the pixel-A and pixel-B columns, and a group of pixel-A, pixel-M, and pixel-B columns is repeatedly arranged in a horizontal direction.

An interval between the pixel-A and pixel-B columns may involve at least one pixel column of at least one kind such as the pixel-M column.

A signal line 41M is connected to source contacts (source electrodes) 19 of the pixels M contained in the pixel-M column. An aluminum pattern line 46 is arranged along the pixel-M column to commonly serve for the pixels M in the pixel-M column and is connected to neither well potential nor common potential. The aluminum pattern line 46 is a dummy line to balance or equalize the wiring of the pixel-M column with that of the pixel-A or pixel-B column.

Between the signal line 41M and the aluminum pattern line 46, a connection line 44M is formed within each pixel M substantially in parallel with the signal line 41M and aluminum pattern line 46.

In this first 3-column arrangement, a well potential for each pixel A in the pixel-A column is supplied through a well line 42A connected to well potential contacts 36 of the pixels A, and a common potential for each pixel A in the pixel-A column is supplied through diffusion capacitor electrodes 22 of hold capacitors C in the pixels B of the left pixel-B column.

A well potential for the pixel-B column is supplied through p⁻ well regions 12 of the right pixel-A column, and a common potential for the pixel-B column is supplied from a common line 43B connected to common potential contacts 37 of the pixel-B column.

A well potential for the pixel-M column is supplied through the p⁻ well regions 12 of the left pixel-A column, and a common potential for the pixel-M column is supplied through the diffusion capacitor electrodes 22 on the hold capacitors C of the right pixel-B column.

In this way, the first 3-column arrangement arranges the well line 42A for each pixel-A column and the common line 43B for each pixel-B column, so that the well potential and common potential for the pixel-A, pixel-M, and pixel-B columns are supplied complementarily from the well line 42A and common line 43B connected to the pixel-A and pixel-B columns. This arrangement results in reducing the number of aluminum wires on the first metal film 26 (FIG. 1) as well as the area of each pixel, thereby making each pixel on the p-type Si substrate 11 finer.

FIG. 10 shows a short circuit occurred in the first 3-column arrangement. Namely, a part of the connection line 44 in the pixel-M column is short-circuited, on the first metal film 26 (FIGS. 1 and 6), to the common aluminum pattern line 46 due to, for example, dust. The common aluminum pattern line 46 is connected to neither well potential nor common potential, and therefore, the short-circuited part in the pixel-M column never causes a pixel defect. Accordingly, arranging the pixel-M column between the pixel-A and pixel-B columns improves the yields of reflective LCDs 10B of the present invention.

FIG. 11 shows the second 3-column arrangement. Pixels arranged on a p-type Si substrate 11 are classified into pixels A (first pixels) vertically aligned in a pixel-A column (first-pixel column), pixels B (second pixels) in a pixel-B column (second-pixel column), and pixels N (third pixels) in a pixel-N column, which is positioned between the pixel-A and pixel-B columns. The pixel-A, pixel-N, and pixel-B columns are repeatedly arranged in this order in a horizontal direction.

The pixel-N column is provided with a signal line 41N that is connected to source contacts (source electrodes) 19 of the pixels N in the pixel-N column. Unlike the arrangement of FIGS. 9 and 10, an aluminum pattern line 47 of FIGS. 11 and 12 is formed within each pixel N. The aluminum pattern line 47 is connected to neither well potential nor common potential. Between the signal line 41N and the aluminum pattern line 47, a connection line 44N is formed within each pixel N in parallel with the signal line 41N and aluminum pattern line 47.

In this second 3-column arrangement, a well potential for the pixel-A column is supplied through a well line 42A connected to well potential contacts 36 of the pixels A of the pixel-A column, and a common potential for the pixel-A column is supplied through diffusion capacitor electrodes 22 of hold capacitors C of the left pixel-B column.

A well potential for the pixel-B column is supplied through p⁻ well regions 12 of the right pixel-A column, and a common potential for the pixel-B column is supplied through a common line 43B connected to common potential contacts 37 of the pixels B in the pixel-B column.

A well potential for the pixel-N column is supplied through the p⁻ well regions 12 in the left pixel-A column, and a common potential for the pixel-N column is supplied through the diffusion capacitor electrodes 22 of the hold capacitors C in the right pixel-B column.

In this way, the second 3-column arrangement arranges the well line 42A for each pixel-A column and the common line 43B for each pixel-B column, so that the well potential and common potential for the pixel-A, pixel-N, and pixel-B columns are supplied complementarily from the well line 42A and common line 43B arranged for the pixel-A and pixel-B columns. This results in reducing the number of aluminum wires on the first metal film 26 (FIG. 1) as well as the area of each pixel. Accordingly, each pixel formed on the p-type Si substrate 11 can be made finer.

FIG. 12 shows short circuits caused in the second 3-column arrangement. Namely, parts of the connection lines 44 in the pixel-N column are short-circuited, on the first metal film 26 (FIGS. 1 and 6), to the aluminum pattern lines 47 of two pixels due to, for example, dust. These aluminum pattern lines 47 are connected to neither well potential nor common potential, and therefore, the short-circuited parts never cause pixel defects. Consequently, arranging the pixel-N column between the pixel-A and pixel-B columns improves the yields of reflective LCDs 10B of the present invention.

It should be understood that many modifications and adaptations of the invention will become apparent to those skilled in the art and it is intended to encompass such obvious modifications and changes in the scope of the claims appended hereto.

What is claimed is:

1. A reflective liquid crystal display having a matrix of pixels formed on a semiconductor substrate, a transparent common electrode, and liquid crystals, the pixels on the semiconductor substrate being aligned in pixel columns and pixel rows, each of the pixels having a switching element formed in a well region of the semiconductor substrate, a reflective pixel electrode connected to the switching element, and a hold capacitor connected to the switching element, the transparent common electrode being formed on a transparent substrate and facing the reflective pixel electrodes, the liquid crystals being sealed between the reflective pixel electrodes and the transparent common electrode, the reflective liquid crystal display comprising:

the pixels including first pixels aligned in first-pixel columns and second pixels aligned in second-pixel columns, the first- and second-pixel columns being alternated in a horizontal direction;

a first fixed potential line formed along each of the first-pixel columns and connected to the well regions of the pixels in the first-pixel column, to supply a first fixed potential to the pixels in the first-pixel column and to the pixels in an adjacent one of the second-pixel columns through the well regions of the first-pixel column; and a second fixed potential line formed along each of the second-pixel columns and connected to diffusion capacitor electrodes formed on the hold capacitors of the pixels in the second-pixel column, to supply a second fixed potential to each pixel in the second-pixel column and to the pixels in an adjacent one of the first-pixel columns through the diffusion capacitor electrodes of the second-pixel column.

2. A reflective liquid crystal display having a matrix of pixels formed on a semiconductor substrate, a transparent common electrode, and liquid crystals, the pixels on the semiconductor substrate being aligned in pixel columns and pixel rows, each of the pixels having a switching element formed in a well region of the semiconductor substrate, a reflective pixel electrode connected to the switching element, and a hold capacitor connected to the switching element, the transparent common electrode being formed on a transparent substrate and facing the reflective pixel electrodes, the liquid crystals being sealed between the reflective pixel electrodes and the transparent common electrode, the reflective liquid crystal display comprising:

the pixels including first pixels aligned in first-pixel columns, second pixels aligned in second-pixel columns, and at least one kind of third pixels aligned in third-pixel columns, the first- and second-pixel columns being alternated in a horizontal direction with the third-pixel column interposed between the first- and second-pixel columns;

a first fixed potential line formed along each of the first-pixel columns and connected to the well regions of the pixels in the first-pixel column, to supply a first fixed potential to the pixels in the first-pixel column, to the pixels in an adjacent one of the second-pixel columns through the well regions of the first-pixel column, and to the pixels in an adjacent one of the third-pixel columns through the well regions of the first-pixel column;

a second fixed potential line formed along each of the second-pixel columns and connected to diffusion capacitor electrodes formed on the hold capacitors of the pixels in the second-pixel column, to supply a second fixed potential to the pixels in the second-pixel column, to the pixels in an adjacent one of the first-pixel columns through the diffusion capacitor electrodes of the second-pixel column, and to the pixels in an adjacent one of the third-pixel columns through the diffusion capacitor electrodes of the second-pixel column; and a pattern line formed along each of the third-pixel columns or formed within each of the third pixels, the pattern line being connected to none of the first and second fixed potentials.

* * * * *